(12) United States Patent
Corbett et al.

(10) Patent No.: US 12,077,246 B2
(45) Date of Patent: Sep. 3, 2024

(54) FRICTION COEFFICIENT DETERMINATION TO ADJUST BRAKING FOR ELECTRONIC BICYCLES

(71) Applicant: Weel Autonomy Inc., Walnut, CA (US)

(72) Inventors: Justin Allan Corbett, Bothell, WA (US); David Carlyle Hansen, Mercer Island, WA (US); Dylan Eugene Meehan, Seattle, WA (US); Matthew William Sheen, Seattle, WA (US)

(73) Assignee: WEEL AUTONOMY INC., Walnut, CA (US)

( * ) Notice: Subject to any disclaimer, the term of this patent is extended or adjusted under 35 U.S.C. 154(b) by 429 days.

(21) Appl. No.: 17/574,930

(22) Filed: Jan. 13, 2022

(65) Prior Publication Data

US 2022/0219777 A1 Jul. 14, 2022

Related U.S. Application Data

(60) Provisional application No. 63/136,643, filed on Jan. 13, 2021.

(51) Int. Cl.
*B62M 6/65* (2010.01)
*B60L 7/18* (2006.01)
(Continued)

(52) U.S. Cl.
CPC .............. *B62M 6/65* (2013.01); *B60L 7/18* (2013.01); *B60L 15/2009* (2013.01);
(Continued)

(58) Field of Classification Search
CPC ........ B60L 7/18; B60L 15/2009; B60L 50/60; B60L 2200/12; B60L 2240/423;
(Continued)

(56) References Cited

U.S. PATENT DOCUMENTS 5,922,035 A * 7/1999 Chen ........................ B62M 6/60
701/52
8,430,192 B2 4/2013 Gillett
(Continued)

OTHER PUBLICATIONS

Third Party Submission under 37 CFR 1.290, Submitted by Carla R. Gillett for U.S. Appl. No. 17/006,555, filed Jul. 17, 2022, 39 pages.
(Continued)

*Primary Examiner* — Dale Moyer
(74) *Attorney, Agent, or Firm* — Fenwick & West LLP

(57) ABSTRACT

An electronic bicycle includes a torque control system that controls what torque is applied to wheels of the electronic bicycle by electronic hub motors. The torque control system may determine a torque to apply to the wheels based on user input signals. The torque control system also may detect when the wheels of the electronic bicycle are slipping, and adjust the torque to minimize the time that the wheel is slipping. Additionally, the torque control system may determine a coefficient of friction between the wheels and the ground and determine a maximum torque to apply to the wheels based on the coefficient of friction. Furthermore, when braking, the torque control system may determine whether torque is applied to the wheels by passive braking or by active braking.

20 Claims, 8 Drawing Sheets

(51) Int. Cl.
| | |
|---|---|
| *B60L 15/20* | (2006.01) |
| *B60W 10/08* | (2006.01) |
| *B62J 45/412* | (2020.01) |
| *B62J 45/413* | (2020.01) |
| *B62J 45/415* | (2020.01) |
| *B62L 1/00* | (2006.01) |
| *B62L 3/00* | (2006.01) |
| *B62L 3/02* | (2006.01) |
| *B62M 6/45* | (2010.01) |
| *B62M 6/50* | (2010.01) |
| *B62M 6/60* | (2010.01) |
| *B60L 50/60* | (2019.01) |
| *B62M 6/55* | (2010.01) |

(52) U.S. Cl.
CPC ............ *B60W 10/08* (2013.01); *B62J 45/412* (2020.02); *B62J 45/413* (2020.02); *B62J 45/4151* (2020.02); *B62J 45/4152* (2020.02); *B62L 1/00* (2013.01); *B62L 3/00* (2013.01); *B62L 3/02* (2013.01); *B62M 6/45* (2013.01); *B62M 6/50* (2013.01); *B62M 6/60* (2013.01); *B60L 50/60* (2019.02); *B60L 2200/12* (2013.01); *B60L 2240/423* (2013.01); *B60L 2240/465* (2013.01); *B62M 6/55* (2013.01)

(58) Field of Classification Search
CPC ..... B60L 2240/465; B60W 10/08; B62L 3/00; B62L 3/02; B62M 6/50; B62M 6/65
See application file for complete search history.

(56) References Cited

U.S. PATENT DOCUMENTS

| | | |
|---|---|---|
| 10,245,937 B2 | 4/2019 | Gillett |
| 10,754,340 B1 | 8/2020 | Corbett et al. |
| 2019/0180525 A1* | 6/2019 | Matsuda ................ G07C 5/085 |
| 2019/0250619 A1* | 8/2019 | Gillett ...................... B62M 6/45 |
| 2021/0139103 A1 | 5/2021 | Gillett |

OTHER PUBLICATIONS

Third Party Submission under 37 CFR 1.290, Submitted by Carla R. Gillett for U.S. Appl. No. 17/591,841, filed Jul. 6, 2022, 51 pages.
Third Party Submission under 37 CFR 1.290, Submitted by Carla R. Gillett for U.S. Appl. No. 17/006,528, filed Jul. 7, 2022, 33 pages.
Third Party Submission under 37 CFR 1.290, Submitted by Carla R. Gillett for U.S. Appl. No. 17/006,555, filed Jul. 7, 2022, 30 pages.

* cited by examiner

FRICTION COEFFICIENT DETERMINATION TO ADJUST BRAKING FOR ELECTRONIC BICYCLES

CROSS-REFERENCE TO RELATED APPLICATIONS

This application claims the benefit of U.S. Provisional Patent Application No. 63/136,643, entitled "Advanced Rider Assistance System for Electric Bicycles", and filed Jan. 13, 2021, the contents of which are hereby incorporated by reference.

BACKGROUND

Electronic bicycles generally use electronic motors to provide some or all of the torque provided to the wheels of the electronic bicycles when the electronic bicycles are accelerated in a forward direction. However, conventional electronic bicycles generally use traditional brakes that slow or stop the electronic using friction. For example, conventional electronic bicycles may use V-brakes or cantilever brakes to apply a force to a surface of the wheel. The friction from the force being applied to the surface causes the kinetic energy of the electronic bicycle to be released as heat energy due to friction. These braking systems have many shortcomings. For example, the kinetic energy of the bicycle is wasted as heat, rather than recaptured by the electronic bicycle. Additionally, these braking systems have little to no control over how much torque a rider can apply to the wheels of the electronic bicycle. This means that a rider may accidentally apply too much torque to the wheels of the electronic bicycle, and thereby may cause the wheels of the electronic bicycle to start slipping against the ground or cause the electronic bicycle to start tipping over the front wheel.

Some electronic bicycles use passive braking, such as regenerative braking, to recapture some of the kinetic energy in the electronic bicycle and recharge the electronic bicycle's battery. However, passive braking often has a maximum torque that it can apply to the wheels, which is based on the speed of the electronic bicycle. Thus, as the electronic bicycle slows from the passive braking, the maximum torque that the regenerative braking can apply decreases.

SUMMARY

An electronic bicycle may use a torque control system to improve how torque is applied to the wheels of the electronic bicycle. The electronic bicycle may include a front and a rear wheel hub motor, which is configured to apply a torque to the front and rear wheels of the electronic bicycle. The wheel hub motors may apply a positive torque to the wheels to cause the electronic bicycle to accelerate forwards, and may apply a negative torque to the wheels to cause the electronic bicycle to decelerate. The wheel hub motors may apply the negative torque to the wheels using active braking (where the wheel hub motors use power from the battery to apply the negative torque) or using passive braking (where the wheel hub motors generate power). When passively braking, the electronic bicycle may use the generated power to power a battery of the electronic bicycle or may dissipate the generated power as heat.

The torque control system of an electronic bicycle may determine how much torque should be applied to the wheels of the electronic bicycle based on user input signals received from a rider. For example, the rider may use brake levers on a handlebar of the electronic bicycle to generate user input signals that indicate that the rider wishes to brake the electronic bicycle. Similarly, the rider may use the pedals of the electronic bicycle to generate user input signals indicating that the user wishes to accelerate the electronic bicycle. Upon receiving the user input signals, the torque control system may determine a positive or negative torque to apply to one or both of the wheels.

The torque control system also may determine when one of the wheels is slipping. The torque control system may determine the angular velocity of one of the wheels and may determine whether the actual angular velocity matches what the angular velocity of the wheel should be if the wheel was not slipping. If the wheel is spinning faster or slower than it should for the electronic bicycle's current speed, then the torque control system may determine that the wheel is slipping. The torque control system may decrease the magnitude of a torque being applied to a slipping wheel to cause the wheel to stop slipping. The torque control system also may apply a torque in the opposite direction of an original torque being applied by the torque control system to reduce the overall time that the wheel is slipping.

The torque control system also may determine when the electronic bicycle is tipping. For example, the torque control system may detect when a wheel experiences a net angular acceleration that is consistent with the wheel no longer being in contact with the ground. When the torque control system detects the electronic bicycle is tipping, the torque control system may reduce the magnitude of a torque being applied to the other wheel to cause the electronic bicycle to stop tipping.

The torque control system also may determine the coefficient of friction between the wheels of the electronic bicycle and the ground. The torque control system may determine the coefficient of friction by causing the wheels to micro-slip against the ground. A wheel micro-slips when the wheel slips against the ground, but for such a short period of time that the electronic bicycle's movement is not substantially impacted by the micro-slip. The torque control system may cause the micro-slip by temporarily increasing the magnitude of a torque being applied to a wheel. If the wheel slips when the magnitude of the torque is increased, then the torque control system determines that the coefficient of friction has been exceeded and can thereby estimate the coefficient of friction. The torque control system may use the coefficient of friction to set a maximum torque that can be applied to the wheels. In some embodiments, the torque control system limits torque applied to a wheel such that the torque applied to the wheel remains some threshold distance away from the maximum torque. For example, the torque control system may limit torque applied to the wheels at 90% of the maximum torque.

When the torque control system determines that a negative torque should be applied to the wheels, the torque control system may determine how the negative torque should be applied to the wheels. For example, the torque control system may apply the negative torque to the wheels using passive braking or active braking. The torque control system may determine a maximum negative torque that the electronic bicycle can achieve using only passive braking. For example, this maximum negative torque through passive braking may be dependent on the current speed of the electronic bicycle. If the torque control system determines a target torque to apply to the wheels that is greater than the maximum negative torque that can be accomplished through passive braking, then the torque control system may apply the target negative torque through active braking.

DETAILED DESCRIPTION

Electronic Bicycle Hardware

An electronic bicycle can be any bicycle in which some or all torque provided to the wheels is provided by an electronic motor (or similar propulsion system). When operated by a rider, the output torque to the wheels can be based on an input power exerted by the rider on pedals of the electronic bicycle (e.g., based on a signal produced by pedals representative of a cadence of pedaling, a speed of pedaling, or a strength of pedaling by the rider). In some embodiments, an electronic bicycle is an autonomous two-wheeled vehicle capable of operating autonomously without a rider. However, an electronic bicycle can be ridden by a rider as a traditional (non-autonomous) bicycle with or without electronic assistance, according to some embodiments. In some implementations, an electronic bicycle is "autonomous capable," that is, able to operate both in "autonomous mode" without a rider or direct rider control and in "manual mode" with direct input from a human rider. For example, the electronic bicycle can autonomously navigate to a chosen destination where a rider is waiting. On arrival, the rider can place the electronic bicycle in manual mode and use it as a traditional bicycle. In some implementations, an electronic bicycle is a bicycle with two wheels, though an electronic bicycle can be any vehicle requiring lateral balance while in operation, such as a unicycle, recumbent bicycle, motorcycle, moped, or motor scooter. Additionally, while the description is predominantly within the context of an electronic bicycle, alternative embodiments may apply the principles described herein to other electronic vehicles, such as automobiles, trucks, all-terrain vehicles, motorcycles, segways, and scooters.

U.S. Pat. No. 10,754,340, entitled "Virtual Gearing in an Autonomous Electronic Bicycle" and issued Aug. 25, 2020, describes additional details regarding some example embodiments of an electronic bicycle. The contents of U.S. Pat. No. 10,754,340 are hereby incorporated by reference.

Figure 1:
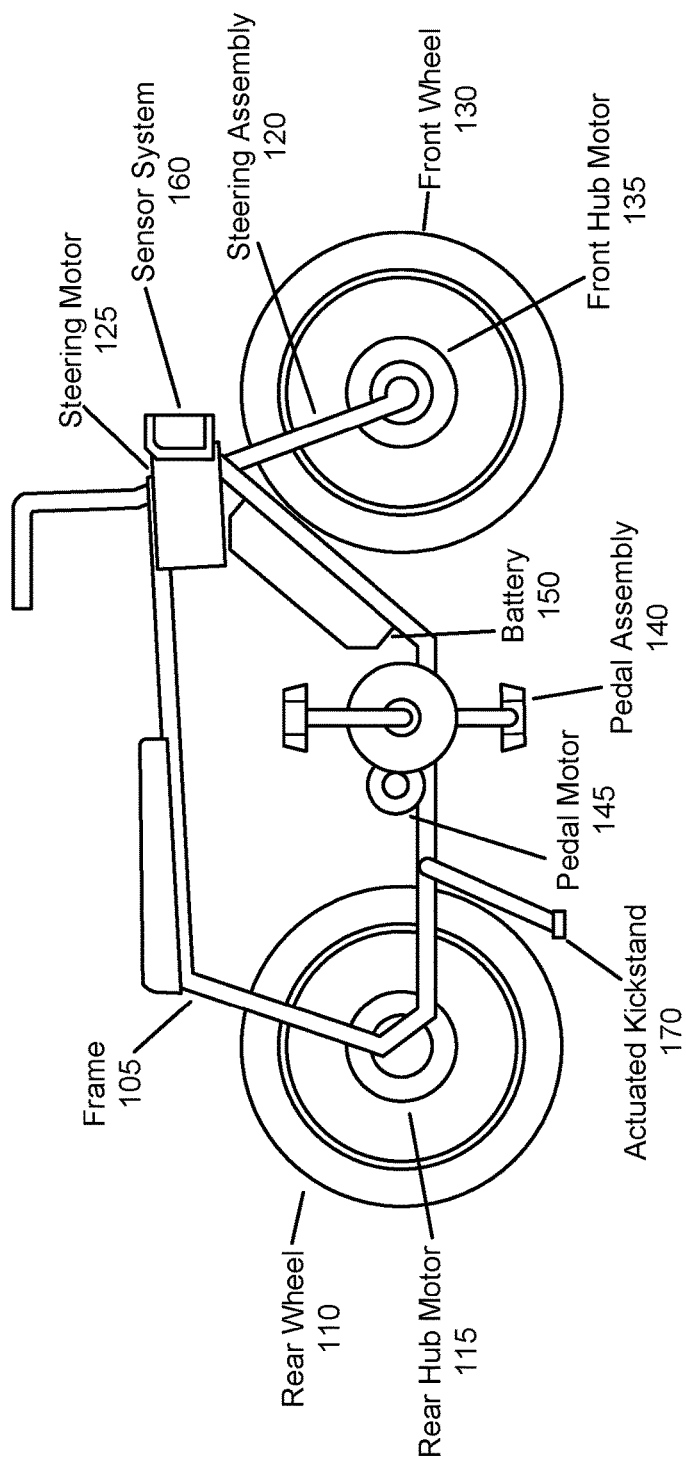
FIG. 1 illustrates example hardware components of an example electronic bicycle, in accordance with an embodiment.

FIG. 1 illustrates example hardware components of an example electronic bicycle, in accordance with an embodiment. The electronic bicycle 100 of FIG. 1 comprises a frame 105, rear wheel 110, rear hub motor 115, steering assembly 120, steering motor 125, front wheel 130, front hub motor 135, pedal assembly 140, pedal motor 145, battery 150, sensor system 160, and kickstand 170. Alternative embodiments may include more, fewer, or different components from those illustrated in FIG. 1, and the structure or functionality of each component may be divided between the components differently from the description below. Additionally, each component may perform their respective functionalities in response to a request from a human, or automatically without human intervention.

The frame 105 of the electronic bicycle 100 can provide a base, platform, or frame for one or more components of the electronic bicycle 100 to attach to. In some embodiments, the frame 105 comprises a seat (or one or more seats) that can accommodate one or more riders of the electronic bicycle 100. The frame 105 can be made of aluminum, steel, carbon fiber, or any other suitable material or combination of materials formed by any suitable method.

In the embodiment of FIG. 1, the frame 105 comprises an attachment for the rear wheel 110 of the electronic bicycle 100. The rear wheel 110 can be made of any suitable materials, may be pneumatic, solid, or of any other suitable type, and can comprise a tire to provide traction on the ground surface. The rear wheel 110 is powered by the rear hub motor 115, which can be integrated into the hub or axle of the rear wheel 110. The rear hub motor 115 can be used to propel the electronic bicycle in a forward or reverse direction and/or to aid in balancing the electronic bicycle 100. The rear hub motor 115 can comprise one or more electric motors and can be geared or ungeared and use any suitable electronic motor technology, for example, the rear hub motor 115 can be a brushed or brushless DC motor, an AC motor, or of any other suitable type. In some implementations, the use of different types of electric motors can affect the final performance of the rear hub motor 115. For example, using an ungeared (or relatively ungeared) motor can allow the electronic bicycle 100 to better control the power applied through the rear hub motor 115, for example through the elimination of mechanical lash in the gearbox of a geared motor. However, ungeared motors may be less energy efficient than an equivalent geared motor.

In some embodiments, the rear hub motor 115 is additionally used to provide braking to the rear wheel 110. For example, the rear hub motor 115 use a regenerative braking system to return power to the battery 150 while providing braking force to the rear wheel 110. Similarly, the rear hub motor 115 can use a dynamic braking system, dissipating the excess energy to the frame, or, in emergency situations, through shorting the rear hub motor 115, according to some embodiments. Other embodiments of the rear wheel 110 can incorporate traditional mechanical brakes in place of or in addition to the use of the rear hub motor 115 as an electronic brake.

Further, in some embodiments, the rear hub motor 115 drives the rear hub of the rear wheel 110 without being integrated into the hub itself. For example, the rear hub motor 115 can drive the rear wheel 110 through a chain or belt drive (such as in a single gear traditional bicycle chain drive). In other embodiments, the rear hub motor 115 is integrated into the hub of the rear wheel 110, but the hub of the rear wheel 110 is also connected to the pedal assembly 140 through a chain or belt drive, for example, to allow a rider of the electronic bicycle 100 to provide mechanical power to the rear wheel 110 with or without the assistance of the rear hub motor 115 (such as in situations where the electronic bicycle 100 is manually operated by a rider.

The frame 105 can additionally be connected to a steering assembly 120, for example, a fork and handlebars enabling the front wheel 130 to be steered relative to the frame 105, in the embodiment of FIG. 1. In some implementations, the steering assembly 120 articulates relative to the frame 105 on one or more pivot points. The steering assembly 120 can be aluminum, steel, carbon fiber, or any other suitable material or combination of materials as described above. In some embodiments, the steering assembly 120 comprises handlebars or another suitable user control allowing a rider of the electronic bicycle 100 to control the steering angle of the front wheel 130 relative to the frame 105.

The steering assembly 120 can also be electronically controlled through the steering motor 125, which can articulate the steering assembly 120 (and therefore the front wheel 130) through a range of steering angles. The steering motor 125 can comprise one or more electric motors and can be geared or ungeared and use any suitable electronic motor technology, for example, the steering motor 125 can be a brushed or brushless DC motor, an AC motor, or of any other suitable type. In implementations where the electronic bicycle 100 is human-rideable, the steering motor 125 is configured to ensure that the steering assembly 120 remains a compliant actuator to user input. In some embodiments, the steering motor 125 is ungeared or minimally geared to minimize the drag provided to the steering assembly 120 when manually turned by a rider of the electronic bicycle 100. Similarly, the steering motor 125 can be intentionally oversized to improve low speed performance (as when turning the steering assembly 120) while ungeared. In some embodiments, the steering motor 125 is additionally used to actively damp the steering of the electronic bicycle 100 when ridden by a human rider. Similarly, some implementations use a "steer by wire" system for user control of the steering assembly 120. In a steer by wire implementation, the manual user controls for steering are not mechanically linked to the front wheel 130, so user steering input is measured and a proportional output is applied to the steering assembly 120 by the steering motor 125 to simulate a mechanical linkage.

The use of the steering motor 125 for active damping may enable the steering assembly 120 to be optimized for autonomous operation while maintaining rideability for a human rider. For example, the head angle (the angle of the head tube of the frame 105) of the steering assembly 120 and frame 105 can be steepened to provide additional responsiveness when operating autonomously, however, the steering motor 125 can be manually used to damp the steering of the electronic bicycle 100, simulating a slacker (more stable) head angle for a human rider.

The front wheel 130, like the rear wheel 110, can be any suitable material, size, and tire type, however, the front wheel 130 may be a different sizes or width than rear wheel 110. In some embodiments, the front wheel 130 is powered by the front hub motor 135. Similar to the rear hub motor 115 and the steering motor 125, the front hub motor 135 can comprise one or more electric motors and can be geared or ungeared and use any suitable electronic motor technology, for example, the front hub motor 135 can be a brushed or brushless DC motor, an AC motor, or of any other suitable type. In some embodiments, the front hub motor 135 and the steering motor 125 are the primary inputs used to control the balance of the electronic bicycle 100. Therefore, a responsive motor (such as an ungeared brushless DC motor) can be used for the front hub motor 135 to enable the electronic bicycle 100 to make fine adjustments to its balance/lean angle. Like the rear hub motor 115, the front hub motor 135 can be used for electronic braking as well (through dynamic braking, regenerative braking, or any suitable method as explained above), and/or the front wheel 130 may comprise a mechanical braking system.

The pedal assembly 140, according to some embodiments, allows a human rider of the electronic bicycle 100 to manually propel or otherwise provide power to the electronic bicycle 100. In some implementations, a virtual pedal system is used in which the pedal assembly 140 is not directly connected to the rear wheel 130 (e.g., via a chain). Instead, the pedal assembly 140 can be connected to the pedal motor 145, acting as a generator to provide which the user can pedal against while generating power for the electronic bicycle 100. The resulting electrical power from the user's pedaling can be stored or used to power (or partially power) the electronic bicycle 100. In some embodiments, the rider of the electronic bicycle 100 can additionally or alternatively control the speed of the electronic bicycle 100 through a throttle or other speed control input. In these cases, the electronic bicycle 100 may not have the pedal assembly 140 or pedal motor 145. The pedal motor 145 can additionally be used to manipulate the pedal assembly 140 when in autonomous mode, for example, to avoid striking the pedals on obstacles when passing by in autonomous mode. The virtual pedal system, including the use of the pedal motor 145 will be discussed in further detail below. In other embodiments, the pedal assembly 140 is connected mechanically to the rear wheel 130, for example with a chain or belt drive as described above.

The electronic bicycle 100 can comprise a battery 150 which can provide power to one or more components of the electronic bicycle 100, such as the front and rear hub motors 135 and 115 and the steering motor 125. The battery 150 can be a single battery or any suitable combination of batteries and/or other power storage devices (such as capacitors). In some embodiments, the battery 150 can send or receive power from one or more of the motors of the electronic bicycle 100, for example, from harvesting power from the pedal motor 145 (such, through the virtual pedal system), or from the front or rear wheel motor 115 and 135 through regenerative braking.

The electronic bicycle 100 can include a sensor system 160 including sensors capable of gathering information about the position of and environment around the electronic bicycle 100. The sensor system 160 can include any suitable sensor or suite of sensors and, although the sensor system 160 is represented as a single unit in FIG. 1, the sensors of the sensor system 160 can be located at any suitable position on the electronic bicycle 100 either grouped together or distributed in any suitable manner. For example, the sensor system 160 can comprise GPS sensors, gyroscopes or other orientation sensors, accelerometers, IMUs (Inertial Measurement Units), magnetometers, motion detectors, pedal and motor position sensors, SLAM (Simultaneous Localization and Mapping) or VSLAM (Visual Simultaneous Localization and Mapping) systems, depth sensors, curb feelers, and any other suitable sensors, each configured to produce a signal representative of a characteristic of the bicycle (such as a location of the bicycle, a position or orientation of the bicycle, a surrounding of the bicycle, and the like).

In some implementations, the electronic bicycle 100 can include an actuated kickstand 170 which may enable the bike to stop and start in autonomous mode without falling over. For example, the actuated kickstand 170 can comprise a linear actuator or electronic motor used to extend and retract the kickstand depending on the current situation. For example, the electronic bicycle 100 can retract the kickstand 170 in response to transitioning (or preparing to transition) from a stop to movement and can extend the kickstand 170 in response to transitioning from movement to a stop. In other embodiments, the electronic bicycle can use a track stand (a stationary two-wheel balance) to stop (for example, when waiting for short lengths of time at an intersection). Similarly, the electronic bicycle 100 can comprise other systems the electronic bicycle 100 in locomotion or balance, for example, a center of gravity shift mechanism allowing the electronic bicycle 100 to actively change the center of gravity to aid in balancing.

Figure 2:
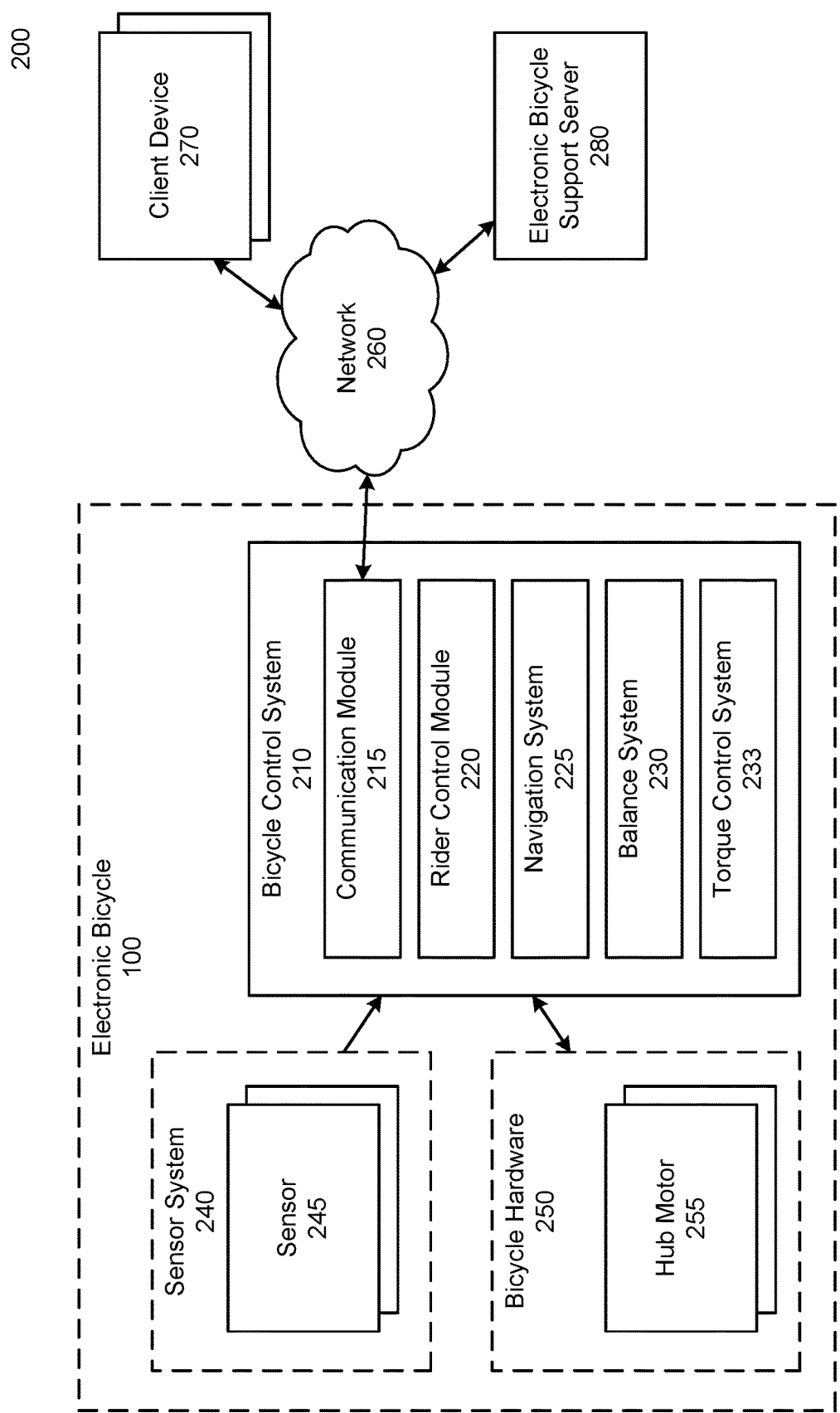
FIG. 2 is a block diagram of an environment in which an electronic bicycle operates, in accordance with an embodiment.

In some implementations, the electronic bicycle 100 is be controlled by a bicycle control system (or a controller or other processor of the bicycle) which can control one or more components of the electronic bicycle 100 based on input or signals from the sensor system 160, the pedal assembly 140, and/or communications with third parties or servers associated with the electronic bicycle 100. FIG. 2 is a block diagram of an environment in which an electronic bicycle operates, in accordance with an embodiment. The environment 200 of FIG. 2 comprises an electronic bicycle 205 communicatively connected one or more client devices 270 and the autonomous vehicle support server 280 over a network 260. Alternative embodiments may include more, fewer, or different components from those illustrated in FIG. 2, and the structure or functionality of each component may be divided between the components differently from the description below. Additionally, each component may perform their respective functionalities in response to a request from a human, or automatically without human intervention.

The electronic bicycle can be an electronic bicycle 100 as illustrated in FIG. 1 or any other suitable vehicle. In the embodiment of FIG. 2, the electronic bicycle 100 comprises a bicycle control system 210, a sensor system 240 comprising one or more sensors 245, and bicycle hardware 250 comprising one or more electronically controllable systems of the electronic bicycle 100, such as the hub motor 255, but which can also include any suitable motor, battery, actuator, or other system controlled by the bicycle control system 210.

The bicycle control system 210 can be any computer system, microcontroller, processor, mobile device, electronic circuit or system, or other suitable computing component mounted on the electronic bicycle 100 capable of operating the electronic bicycle 100. In the embodiment of FIG. 2, the bicycle control system 210 comprises a communication module 215, a rider control module 220, a navigation system 225, a balance system 230, and a torque control system 233.

In some implementations, the communication module 215 facilitates communications of the bicycle control system 210 over the network 260 using any suitable communication protocol. For example, the bicycle control system 210 can communicate with one or more client devices 270 over the network, for example to enable the electronic bicycle 100 to be controlled by a user of the client device 270, or for any other suitable reason. Similarly, the communication module 215 can communicate with the electronic bicycle support server 280 over the network 260. For example, the bicycle control system 210 can receive a destination for autonomous travel from the electronic bicycle support server 280.

The rider control module 220 can, in some embodiments, control functions of the electronic bicycle 100 used when the electronic bicycle 100 is in manual mode. For example, the rider control module 220 can manipulate the bicycle hardware 250 to alter the handling characteristics of the electronic bicycle 100 to provide a better riding experience for a human rider. For example, the rider control module 220 can electronically damp rider steering inputs to simulate more stable riding characteristics than provided by the physical design of the electronic bicycle 100. For example, as described above, the steering motor 125 can be used to simulate a more stable steering response than natural based on the design of the electronic bicycle 100. Similarly, in implementations using steer by wire user steering controls, the rider control module 220 can magnify certain user steering inputs, or otherwise actively stabilize the electronic bicycle 100. Additionally, the rider control module 220 can power one or more of the front and rear hub motors 135 and 115 in response to user inputs to drive the electronic bicycle 100. For example, the rider control module 220 can output power proportional to a power output by a user through the pedal assembly 140 to one or more of the front and rear hub motors 135 and 115. In some embodiments, the rider control module 220 controls the front and rear hub motors 135 and 115 by using the torque control system 233, as described below.

In some implementations, the navigation system 225 and balance system 230 are active when the electronic bicycle 100 and the rider control module 220 is inactive while the electronic bicycle is in autonomous mode. Similarly, when the navigation system 225 and balance system 230 may be inactive when the electronic bicycle is in manual mode. In some embodiments, the rider control unit 220 can be used to control the electronic bicycle 100 remotely while in autonomous mode. For example, the electronic bicycle 100 can be remotely controlled (in some embodiments, by a user connected to the autonomous bicycle support server 280) to perform maneuvers the electronic bicycle 100 cannot perform autonomously (such as unprotected left turns across traffic).

The navigation system 225 can, in some embodiments, select a target pose for the electronic bicycle 100 to achieve. As used herein a "pose" of the electronic bicycle 100 represents a state of the electronic bicycle 100 at a specific time. For example, a pose of the electronic bicycle 100 can include a position of the frame 105 in 4D space (that is, an XYZ coordinate position and a time), a heading of the electronic bicycle 100, a heading rate (i.e., the speed at which the electronic bicycle 100 is turning), a velocity and/or acceleration of the electronic bicycle 100, a lean angle of the electronic bicycle 100, and any other suitable information about the state of the electronic bicycle. A pose can also include a relative or absolute position and/or orientation of one or more additional components of the electronic bicycle 100, for example an orientation of the front wheel 130 relative to the frame 105, or an angle of rotation of the pedal assembly 140. According to some implementations, the pose of the electronic bicycle 100 is measured relative to a point on the frame 105, and therefore does not account for any moving parts of the electronic bicycle 100 such as the front wheel 130 and the steering assembly 120, which may be, in these embodiments, measured relative to the position and orientation of the frame 105. In some embodiments, the pose of the electronic bicycle 100 is measured from a known origin point, for example, a point on the frame 105 of the electronic bicycle 100 or an external reference point such as a location destination, an external object or location within the vicinity of the electronic bicycle 100, or the like. In some implementations, a pose of the electronic bicycle 100 can be represented as a quaternion. According to some embodiments, the target pose determined by the navigation system 225 comprises a target heading rate and target velocity of the electronic bicycle 100.

In some embodiments, the navigation system 225 can select a target pose for the electronic bicycle 100 based on a determined destination and route to the destination, such as where the destination is a target point and the route is as set of high-level instructions to reach that point. For example, the destination can be a certain address and the route can be a series of streets and turns to follow when traveling to the address. In some implementations, the destination and/or the route is determined internally by the bicycle control system 210 or, in other implementations is provided by an external system. For example, the destination may be provided by a client device 270 or the electronic bicycle support server 280, and the route can be determined by the electronic bicycle support server 280 using a third-party service. The navigation system 225 will be discussed in further detail below.

The balance system 230 can, in some embodiments, take a target pose from the navigation system 225 and control the bicycle hardware 250 towards achieving the target pose while keeping the electronic bicycle 100 balanced. For example, the balance system 230 may set the output torque of one or more of the hub motors 115 and 135 and the steering motor 125 to move the electronic bicycle 100 through the target pose. In some implementations, the balance system 230 can modify a received target pose from the navigation system 225 (or generate a new target pose) to maintain the balance of the electronic bicycle 100. For example, the navigation system 225 can alter the target pose based on the current pose, the current acceleration, or any other factor that may impact the balance of the electronic bicycle 100.

In some embodiments, the electronic bicycle 100 includes a torque control system 233 that controls how torque is applied to the wheels of the electronic bicycle 100. The torque control system 233 may determine a torque to be applied to the wheels and may determine how that torque should be applied to the wheels. For example, if the torque control system 233 determines that a braking torque should be applied to the wheels, the torque control system 233 may determine whether the braking torque should be applied through passive braking or active braking. Additionally, the torque control system 233 may control the torque applied to each wheel to ensure that the wheels do not slip and to ensure that the torque does not cause the bicycle to tip. The torque control system 233 is discussed in further detail with regards to FIG. 3 below.

The network 260, which may comprise any combination of local area and/or wide area networks, using both wired and/or wireless communication systems. In one embodiment, the network 260 uses standard communications technologies and/or protocols. For example, the network 260 can include communication links using technologies such as Ethernet, 3G, 4G, CDMA, WIFI, and Bluetooth. Data exchanged over the network 260 may be represented using any suitable format, such as hypertext markup language (HTML) or extensible markup language (XML). In some embodiments, all or some of the communication links of the network 260 may be encrypted using any suitable technique or techniques.

Each client device 270 can be a computing device capable of receiving user input as well as transmitting and/or receiving data via the network 260. In some embodiments, a client device 270 is a device having computer functionality, such as a mobile telephone, a smartphone, or another suitable device. In one embodiment, a client device 270 executes an application or web application allowing a user of the client device 270 to interact with the electronic bicycle 100 or the electronic bicycle support server 280. In another embodiment, a client device 270 interacts with the electronic bicycle 100 or the electronic bicycle support server 280 through an application programming interface (API) running on a native operating system of the client device 270. In some implementations, a user of the client device 270 can request use of an electronic bicycle 100 through an app or website over the network 260. Similarly, the destination can be a location provided by a potential rider through a mobile application running on a client device 270. In some implementations, an electronic bicycle 100 then autonomously drives itself to (or near to) the user of the client device 270 or another specified destination in autonomous mode. The user of the client device 270 can then place the electronic bicycle 100 in manual mode and ride the electronic bicycle 100 as needed.

The electronic bicycle support server 280 can any suitable server, server cluster, or cloud-based server capable of communication with and support of one or more electronic bicycles 100. In some embodiments, the electronic bicycle support server 280 can provide navigation instructions and/or route information. Similarly, the electronic bicycle support server 280 can provide object recognition processing or other functions of the navigation system 225 remotely, according to some embodiments. For example, when the additional lag introduced by sending data to the electronic bicycle support server 280 would not present safety concerns.

Example Torque Control System

Figure 3:
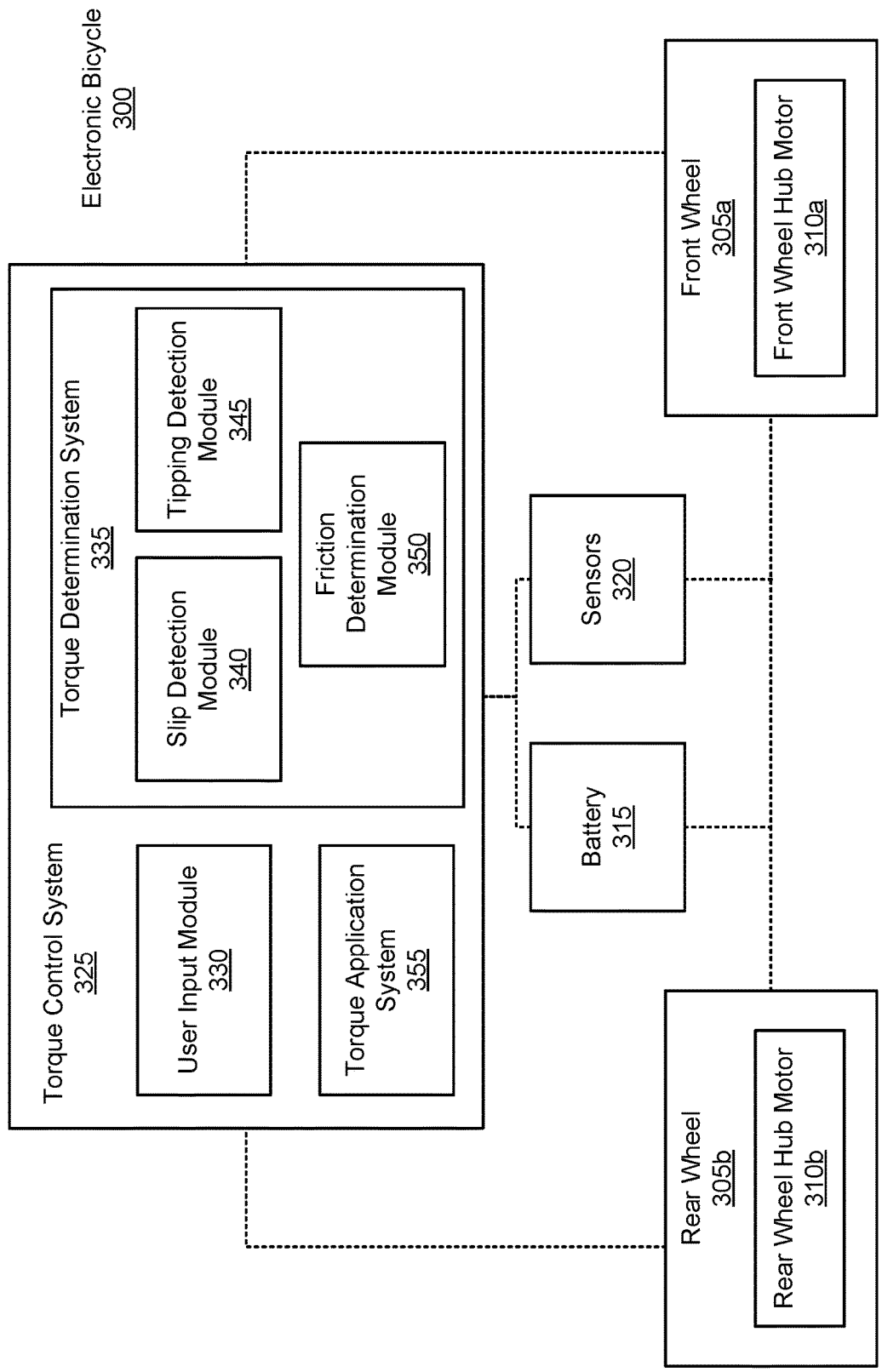
FIG. 3 is a block diagram illustrating the environment and structure of a torque control system of an electronic bicycle, in accordance with some embodiments.

FIG. 3 is a block diagram illustrating the environment and structure of a torque control system 233 of an electronic bicycle 300, in accordance with some embodiments. Each illustrated component may comprise hardware and software components that provide the described structure or functionality. Alternative embodiments may include more, fewer, or different components from those illustrated in FIG. 3, and the structure or functionality of each component may be divided between the components differently from the description below. Additionally, each component may perform their respective functionalities in response to a request from a human, or automatically without human intervention. Furthermore, the electronic bicycle 300 may include one or more of the structural and functional components of the electronic bicycles illustrated in FIGS. 1 and 2.

The electronic bicycle 300 includes a front wheel 305a and a rear wheel 305b. The front wheel 305a includes a front wheel hub motor 310a and the rear wheel 305b includes a rear wheel hub motor 310b. The front wheel 305a and the rear wheel 305b may be referred to collectively as "a wheel 305" or "the wheels 305." Similarly, the front wheel hub motor 310a and the rear wheel hub motor 310b may be referred to collectively as "a wheel hub motor 310" or "the wheel hub motors 310." The wheel hub motors 310 can be used to apply a positive torque or a negative torque to the wheels 305. The term "positive torque" is used herein to mean a torque applied to a wheel 305 that accelerates the electronic bicycle 300 in a forward direction. Similarly, the term "negative torque" is used herein to mean a torque applied to a wheel 305 that accelerates the electronic bicycle 300 in a backwards direction or that stops the electronic bicycle 300.

The wheel hub motors 310 may apply a positive or negative torque to their corresponding wheel 305 when powered by the battery 315. The wheel hub motors 310 also may provide power to the battery 315 when applying a negative torque to the wheels 305. For example, the wheel hub motors 310 may be capable of acting as a generator or dynamo that applies a negative torque to the wheels 305 while providing power to the battery 315. The wheel hub motors 310 also may dissipate the generated power by heating a frame of the electronic bicycle 300 when applying negative torque to the wheels 305. In some embodiments, the wheel hub motors 310 pass current through a resistor that is coupled to the frame of the electronic bicycle 300 to dissipate generated power as heat when applying negative torque to the wheels. The wheel hub motors 310 may be controlled by a motor controller, which may be part of the torque control system 325.

In some embodiments, the electronic bicycle 300 includes mechanical brakes that can apply a negative torque to the wheels 305. For example, the electronic bicycle may include V-brakes, cantilever brakes, disk brakes or static holding brakes. The mechanical brakes may be controlled through a mechanical system (e.g., a braking cable) or through an electrical system (e.g., a brake-by-wire system).

Electronic bicycle 300 may include sensors 320 that measure components of the electronic bicycle 300. For example, the electronic bicycle 300 may include a rotary encoder that measures the angular position of the wheel 310, from which the electronic bicycle 300 may determine the angular velocity and net angular acceleration of the wheels 310. The sensors 320 also may include an accelerometer, which measures the overall acceleration of the electronic bicycle 300, a gyroscope, which measures the angular velocities of electronic bicycle 300, or an inertial measurement unit (IMU), which measures accelerations, angular velocities, or magnetic field readings and may combine these readings to generate orientation data. The sensors 320 may include a weight measurement sensor that can measure the weight of the electronic bicycle 300 or a rider on the electronic bicycle 300. Sensors 320 may also include a global positioning system (GPS) module to measure the speed and position of electronic bicycle 300.

The sensors 320 also may include sensors that measure the environment around the electronic bicycle 300. For example, the sensors 320 may include a thermometer that measures the temperature of the air around the electronic bicycle 300 or a barometer to measure atmospheric pressure. The sensors 320 also may include one or more cameras that capture images or video of the electronic bicycle's surroundings. In some embodiments, the sensors 320 include RADAR or LIDAR that sense objects around the electronic bicycle 300.

The electronic bicycle 300 includes a torque control system 325. The torque control system 325 determines how much torque to apply to the wheels 305 and how the torque should be applied. For example, the torque control system 325 may receive signals from a user indicating that the user wishes to decelerate or brake the electronic bicycle 300. The torque control system 325 determines how much negative torque should be applied to the wheels 305 based on the received signals and determines how the negative torque should be applied to the wheels 305. The torque control system 325 illustrated in FIG. 3 includes a user input module 330, a torque determination system 335, and a torque application system 355. Each illustrated component may comprise hardware and software components that provide the described structure or functionality. Alternative embodiments may include more, fewer, or different components from those illustrated in FIG. 3, and the structure or functionality of each component may be divided between the components differently from the description below. Additionally, each component may perform their respective functionalities in response to a request from a human, or automatically without human intervention.

The user input module 330 receives user input signals that indicate a user's intent to accelerate or decelerate the electronic bicycle 300. For example, the user input module 330 may receive user input signals from the electronic pedals indicating an intended speed of the user. If the user input signals from the electronic pedals indicate that the user is pedaling more quickly, the user input module 330 may determine that the user intends to accelerate the bicycle. Similarly, if the user input signals indicate that the user is pedaling less quickly, the user input module 330 may determine that the user intends to decelerate the bicycle.

Additionally, the user input module 330 may receive signals from components of the electronic bicycle that the user can use to brake. For example, the user may use braking levers on handlebars of the electronic bicycle 300 to cause the electronic bicycle 300 to brake. The braking levers may provide a user input signal to the user input module 330 that the user intends to brake and how quickly the user intends to brake. Similarly, the user may pedal backwards to cause the electronic bicycle 300 to brake.

In some embodiments, the user input module 330 receives instructions for autonomous control of the electronic bicycle 300. For example, the user input module 330 may receive instructions from a remote server on a target speed or target acceleration for the electronic bicycle 300 to achieve. Additionally, the user input module 330 may receive instructions on a target location or pose for the electronic bicycle 300 to achieve.

The torque determination system 335 determines a target torque to apply to the wheels based on intended acceleration or deceleration determined by the user input module 330. For example, if the user input module determines that the user wants to accelerate the electronic bicycle 300, the torque determination system 335 determines that a positive target torque should be applied to the wheels 305 by the wheel hub motors 310. Similarly, if the user input module 330 determines that the user wants to decelerate the electronic bicycle, the torque determination system 335 may determine that a negative torque should be applied to the wheels 305 by the wheel hub motors 310. The torque determination system 335 may determine a target torque to apply to both wheels 305 or may determine a separate target torque for each wheel 305.

The torque determination system 335 may determine the magnitude of a target torque to apply to the wheels 305 based on a determined acceleration or deceleration intended by the user by the user input module. Additionally, the torque determination system 335 may determine the magnitude of the target torque to apply to the wheels based on the weight of the bicycle, the weight of the passenger, or the moments of inertia of the wheels.

In some embodiments, the torque determination system 335 determines a torque to apply to the wheels 305 based on a target stop distance. For example, the user input module 330 may provide a target stop distance for the electronic bicycle to achieve based on user inputs. Alternatively, the sensors 320 may determine that the electronic bicycle could collide with an object that is a target distance away. The torque determination system 335 may determine a negative torque to apply to the wheels to stop the electronic bicycle 300 within the target stop distance. In some embodiments, the torque determination system 335 determines the torque to apply based on an amount of kinetic energy the electronic bicycle needs to lose to stop within the target stop distance.

The torque determination system 335 may include a slip detection module 340. The slip detection module 340 determines when a wheel 305 is slipping, i.e., when the portion of the wheel 305 that is in contact with the ground sliding against the ground. When a wheel 305 is slipping, the force that the wheel 305 can apply to the ground decreases because it is capped based on the dynamic coefficient of friction, rather than the static coefficient of friction. Thus, the slip detection module 340 may adjust the target torque for a wheel 305 when the slip detection module 340 determines that a wheel 305 is slipping.

The slip detection module 340 may detect that a wheel 305 is slipping based on the speed of the electronic bicycle 300 and the angular velocity of the wheel 305. For example, if the angular velocity of the wheel 305 does not correspond with the speed of the electronic bicycle 300 (e.g., the wheel 305 is spinning faster or slower than it should for the speed of the electronic bicycle 300), then the slip detection module 340 may determine that the wheel 305 is slipping. The slip detection module 340 may determine the speed of the electronic bicycle 300 based on image data, RADAR data, LIDAR data, accelerometer data, or GPS data.

In some embodiments, the slip detection module 340 determines the speed of the electronic bicycle 300 based on the angular velocity of each wheel 305. The slip detection module 340 may compare the angular velocity of each wheel 305. If angular velocities of the wheels 305 are substantially similar, the slip detection module 340 may determine that the speed of the electronic bicycle 300 matches the angular velocities of the wheels 305 and may determine the speed of the electronic bicycle 300 based on the angular velocities of the wheels 305. In some embodiments, the slip detection module 340 uses an average of the angular velocities of the wheels 305 to determine the speed of the electronic bicycle 300.

If the angular velocities of the wheels are not substantially similar, the slip detection module 340 may compare the angular velocity of each wheel with an estimated speed of the electronic bicycle 300 determined based on acceleration data. The slip detection module 340 may use an angular velocity of a wheel that most closely matches the estimated speed to determine the speed of the electronic bicycle 300. In some embodiments, the slip detection module 340 uses a Kalman Filter, Particle Filter, or a machine learning model to determine a speed of the electronic bicycle 300.

The slip detection module 340 also may detect a wheel 305 slipping based on a change in the angular acceleration of a wheel 305. For example, if the slip detection module 340 detects that the angular acceleration of a wheel has increased and the torque applied to the wheel 305 by the wheel hub motor 310 has not changed, the slip detection module 340 may determine that the wheel 305 is slipping.

If the slip detection module 340 determines that a wheel is slipping, the slip detection module 340 may decrease the magnitude of the target torque applied to the wheels 305. For example, if the slip detection module 340 detects that a wheel 305 is slipping while a positive torque is being applied to the wheel 305, the slip detection module 340 may decrease the magnitude of the positive torque being applied to the wheel 305. Similarly, if the slip detection module 340 detects that a wheel is slipping while a negative torque is being applied to the wheel 305 (e.g., while the electronic bicycle 300 is braking), the slip detection module 340 may decrease the magnitude of the negative torque applied to the wheel 305. In some embodiments, the slip detection module 340 can detect slippage on one wheel 305 and not on the other wheel 305. The slip detection module 340 may then decrease the magnitude of the target torque applied to the slipping wheel 305 and not the non-slipping wheel 305.

In some embodiments, the slip detection module 340 may use a slip ratio of a wheel 305 to determine how much to decrease the magnitude of the target torque. A slip ratio is a ratio of the measured angular velocity of a wheel 305 to the expected angular velocity of the wheel 305 based on the speed of the electronic bicycle 300. The slip detection module 340 may decrease the magnitude of the target torque proportionally with changes in the slip ratio. In some embodiments, the slip detection module 340 decreases the magnitude of the target torque when the slip ratio meets a threshold, and decreases the magnitude of the target torque linearly with respect to the slip ratio from the first threshold slip ratio to a second threshold slip ratio.

In some embodiments, if the slip detection module 340 detects that a wheel 305 is slipping, the slip detection module 340 temporarily applies a torque in the opposite direction to reduce the overall amount of time the wheel 305 is slipping. For example, the slip detection module 340 may detect that a wheel 305 is slipping while the electronic bicycle 300 is applying a negative torque to the wheels 305 (e.g., while the electronic bicycle is braking). Rather than simply decreasing the magnitude of the negative torque, the slip detection module 340 may apply a positive torque to the wheel 305. By applying the positive torque rather than just decreasing the magnitude of a negative torque, the wheel 305 is more quickly brought to an angular velocity that corresponds to the speed of the electronic bicycle 300, and thus the wheel 305 stops slipping more quickly. Similarly, when the slip detection module 340 detects that a wheel 305 is slipping while the electronic bicycle is applying a positive torque to the wheels 305, the slip detection module 340 may temporarily apply a negative torque to the wheel 305 to reduce how long the wheel 305 is slipping.

The slip detection module 340 may detect when a wheel 305 is no longer slipping. For example, the slip detection module 340 may determine that the wheel's angular velocity corresponds to the electronic bicycle's speed and thereby determine that the wheel 305 is no longer slipping. If the slip detection module 340 detects that a wheel 305 is no longer slipping, then the slip detection module 340 may apply a target torque that is the same as the torque applied to the wheel 305 when the wheel 305 started slipping. In some embodiments, after detecting a wheel 305 has stopped slipping, the slip detection module 340 applies a target torque to the wheel 305 that is similar to the torque applied to the wheel 305 before the wheel 305 started slipping, but is reduced in magnitude.

In some embodiments, when the slip detection module 340 detects that one wheel 305 is slipping, the slip detection module 340 may increase the magnitude of the target torque applied to the other wheel 305. For example, if the rear wheel 305b starts slipping while the electronic bicycle 300 is applying a negative torque to the wheels 305 (e.g., while braking), the slip detection module 340 may increase a negative torque applied to the front wheel 305a to maintain a consistent deceleration of the electronic bicycle 300.

In some embodiments, the electronic bicycle 300 includes a tipping detection module 345. The tipping detection module 345 detects when torque applied by the electronic bicycle 300 to the wheels 305 may cause the electronic bicycle 300 to tip over the front wheel 305a or the rear wheel 305b. For example, the tipping detection module 345 may detect when a negative torque applied to the front wheel 305a (e.g., during braking) may cause the electronic bicycle 300 to tip over the front wheel 305a. Similarly, the tipping detection module 345 may detect when a positive torque applied to the rear wheel 305b may cause the electronic bicycle 300 to tip over the rear wheel 305b. The tipping detection module 345 may detect when the electronic bicycle 300 may tip based on the weight of the electronic bicycle, the weight of the wheels, the weight of a rider, the torque applied to the front or rear wheel, or angular position, velocity, or acceleration of the front or rear wheel. The tipping detection module 345 also may detect when the electronic bicycle 300 is tipping based on accelerometer data or gyroscopic data from a sensor 320.

In some embodiments, the tipping detection module 345 detects that the electronic bicycle 300 is tipping when the tipping detection module 345 determines that the net angular acceleration of one of the wheels 305 is consistent with the wheel 305 no longer being in contact with the ground. For example, the tipping detection module 345 may compare a torque applied to a wheel 305 by a wheel hub motor 310 and the net angular acceleration of the wheel 305. If the angular acceleration of the wheel 305 is consistent with the torque applied to the wheel 305 by the wheel hub motor 310 being equal, or substantially equal, to the net torque applied to the wheel 305 (e.g., if no other torque is acting on the wheel 305 other than the torque applied by the wheel hub motor 310), then the tipping detection module 345 may detect that the electronic bicycle 300 is tipping such that the wheel 305 is no longer making contact with the ground.

The tipping detection module 345 may detect that the electronic bicycle 300 is tipping based on sensor data captured by sensors on the electronic bicycle 300. For example, the tipping detection module 345 may use image data captured by cameras on the electronic bicycle 300 to detect that the electronic bicycle 300 is tipping. The tipping detection module may apply a machine-learning model (e.g., a neural network) to the image data to determine whether the electronic bicycle 300 is tipping.

In some embodiments, the tipping detection module 345 detects that the electronic bicycle 300 is tipping based on pitch data captured by a sensor (e.g., an inertial measurement unit). For example, if the tipping detection module 345 determines that the electronic bicycle 300 has tipped beyond a threshold angle, the tipping detection module 345 may detect that the electronic bicycle 300 is tipping. The tipping detection module 345 also may determine a pitch rate and detect whether the electronic bicycle 300 is tipping based on the pitch rate. For example, the tip detection module 345 may detect that the electronic bicycle 300 is tipping if the tip detection module 345 determines that the pitch of the electronic bicycle 300 is changing quickly. In some embodiments, the tip detection module 345 generates a tipping score representing a likelihood that the electronic bicycle 300 is tipping. The tip detection module 345 may generate a tipping score based on angular velocities of the wheels 305 and a pitch rate of the electronic bicycle 300. The tip detection module 345 may detect that the electronic bicycle 300 is tipping if the tipping score exceeds a threshold. In some embodiments, the tip detection module 345 generates the tipping score based on a linear combination of a pitch rate of the electronic bicycle 300 and angular velocities of the wheels 305. The linear combination may use predetermined weights to detect tipping. In some embodiments, the linear combination is based on a difference between the angular velocity of a wheel 305 and a predicted angular velocity of the wheel 305 based on the speed of the electronic bicycle 300. For example, the tipping detection module 345 may predict what the angular velocity of a wheel 305 should be based on a determined speed of the electronic bicycle 300, and may use the difference between that predicted angular velocity and a measured angular velocity to detect tipping using the linear combination. In some embodiments, the tipping detection module 345 uses separate linear combinations for each wheel 305 of the electronic bicycle 300 to determine whether the electronic bicycle 300 is tipping over the front wheel 305a or the rear wheel 305b.

If the tipping detection module 345 detects that one wheel 305 is no longer in contact with the ground because the electronic bicycle is tipping, the tipping detection module 345 may reduce the magnitude of the torque being applied to the other wheel 305. For example, if the rear wheel 305b is no longer in contact with the ground because the electronic bicycle 300 is tipping forward due to a negative torque being applied to the front wheel 305a, then the electronic bicycle 300 may reduce the magnitude of the negative torque being applied to the front wheel 305a. In some embodiments, when one wheel 305 is no longer in contact with the ground, the tipping detection module 345 temporarily reverses the direction of the torque being applied to the other wheel 305 to reduce the amount of time the wheel 305 is not in contact with the ground. For example, where the rear wheel 305b is no longer in contact with the ground because of a negative torque being applied to the front wheel 305a, the tipping detection module 345 may temporarily apply a positive torque to the front wheel 305a until the rear wheel 305b comes in contact with the ground again.

In some embodiments, the torque determination system 335 includes a friction determination module 350. The friction determination module 350 determines coefficients of friction between each wheel 305 of the electronic bicycle and the ground. The friction determination module 350 may determine the coefficients of static and dynamic friction between the wheels 305 and the ground. The friction determination module 350 may determine coefficients of static or dynamic friction for both wheels 305, or may determine coefficients of static or dynamic friction for each wheel 305 individually.

The friction determination module 350 may determine coefficients of static friction based on micro-slips. A micro-slip is a slip that is intentionally caused by the electronic bicycle 300, but where the duration of the slip is so short that it does not impact substantially the performance of the electronic bicycle 300. For example, a micro-slip may be 10 to 50 milliseconds in length. To generate a micro-slip, the electronic bicycle 300 may temporarily increase the magnitude of a torque it is applying to a wheel 305. If the wheel 305 begins to slip when the increased torque is applied, then the friction determination module 350 may determine that coefficient of static friction was exceeded, and thus may determine an upper bound on the coefficient of static friction based on the increased magnitude of the torque applied. Similarly, if the wheel 305 does not slip, the friction determination module 350 may determine that the coefficient of static friction was not exceeded, and thus can determine a lower bound on the coefficient of static friction.

The friction determination module 350 may similarly determine coefficients of dynamic friction based on micro-slips. The friction determination module 350 may temporarily increase the magnitude of a torque that the electronic bicycle 300 is applying to a wheel 305 to cause the wheel 305 to slip. The friction determination module 350 may then decrease the magnitude of the torque to a lower value than the increased value, but a higher value than the original torque being applied to the wheel 305. If the wheel 305 continues to slip, then the friction determination module 350 may determine that the magnitude of the new torque exceeds the coefficient of dynamic friction, and may then determine an upper bound on the coefficient to dynamic friction. Similarly, if the wheel 305 stops slipping, the friction determination module 350 may determine that the magnitude of the new torque does not exceed the coefficient of dynamic friction, and may then determine a lower bound on the coefficient of dynamic friction.

The friction determination module 350 may continually determine upper and lower bounds on the coefficients of static and dynamic friction to generate estimates of the coefficients of static and dynamic friction. For example, the friction determination module 350 may select the increases to the magnitudes of torque applied to wheels 305 such that the upper and lower bounds begin to converge to an estimate of the static and dynamic coefficients of friction. The friction determination module 350 may continually generate estimates of the static and dynamic coefficients of friction during operation of the electronic bicycle.

In some embodiments, the friction determination module 350 estimates coefficients of friction based on data of the surroundings of the electronic bicycle. For example, the friction determination module 350 may receive image or video data of the ground on which the electronic bicycle 300 is traveling from a camera coupled to the electronic bicycle 300. The friction determination module 350 may also receive data on the current weather, the type of surface on which the electronic bicycle 300 is traveling, tire pressure of the wheels 305, or the weight of the user or the electronic bicycle 300. The friction determination module 350 may estimate coefficients of friction based on the received data. For example, the friction determination module 350 may apply a machine learning model (e.g., a neural network) to the data to estimate coefficients of friction for the wheels 305. In some embodiments, the machine-learning model includes a computer-vision model that has been trained to determine the conditions of a surface on which the electronic bicycle is traveling based on image or video data. For example, the computer-vision model may determine whether the surface is wet or has debris (e.g., sand or leaves) that may impact the coefficients of friction of the wheels 305 on the surface.

When the user input module 330 receives user input signals from the user to accelerate or decelerate the electronic bicycle 300, the torque determination module 335 may use coefficients of friction determined by the friction determination module 350 to determine a target torque to apply to the wheels 305. For example, the torque determination system 335 may use an estimated coefficient of static friction for a wheel 305 to determine a maximum target torque that can be applied to a wheel 305 before the wheel 305 starts slipping. Similarly, the torque determination system 335 may limit the torque applied to a wheel 305 such that the torque applied to the wheel 305 remains some threshold difference away from the maximum target torque based on the coefficient of friction. For example, the torque determination system 335 may limit the target torque applied to a wheel 305 such that the remains less than 90% of the maximum torque that can be applied based on the coefficient of static friction. If the torque determination system 335 determines that the magnitude of a torque applied to the wheel 305 exceeds the threshold magnitude (e.g., because the friction determination module 350 has determined that the coefficient of static friction has changed), then the torque determination system 335 may decrease the magnitude of the torque applied to the wheel 305 such that it is in compliance with the threshold magnitude of torque.

The electronic bicycle 300 may include a torque application system 355. When the electronic bicycle determines a target torque to be applied to a wheel 305 (e.g., by the torque determination system 335), the torque application system 355 determines how the torque is applied to wheel 305. To apply a positive torque to a wheel 305, the torque application system 355 powers the wheel hub motor 310 for the wheel 305. To apply a negative torque to a wheel 305, the torque application system 355 may apply the negative torque to the wheel 305 through active braking. The torque application system 355 uses active braking when the wheel hub motor 310 uses energy from the battery 315 to apply a negative torque to the wheel 305. For example, the torque application system 355 may determine a current to apply to a wheel hub motor 310 to apply a target torque to the wheel 305. In some embodiments, the torque application system 355 determines a current to apply to a wheel hub motor 310 based on a known constant that represents the relationship between the current applied to the wheel hub motor 310 and a torque output by the wheel hub motor 310.

The torque application system 355 also may apply a negative torque to a wheel 305 through passive braking. The torque application system 355 uses passive braking when the wheel hub motor 310 does not use energy from the battery 315 to apply the negative torque to the wheel 305. For example, the torque application system 355 may use regenerative braking or rheostatic braking to passively brake a wheel 305. To regeneratively brake a wheel 305, the torque application system 355 may use the wheel hub motor 310 as a dynamo or a power generator to apply the negative torque to the wheel 305. The power generated by the wheel hub motor 310 when regeneratively braking may be provided to the battery 315 to recharge the battery. To rheostatically brake a wheel 305, the torque application system 355 may run a current generated by the wheel hub motor 310 while the wheel hub motor 310 is passively braking through a resistor that is coupled to a frame of the electronic bicycle 300. The heat generated as the current passes through the resistor may be dissipated through the frame of the electronic bicycle 300. When passively braking, the torque application system 355 may use a combination of regenerative braking and rheostatic braking.

When the torque application system 355 receives a target negative torque to apply to a wheel 305, the torque application system 355 may determine whether the target negative torque can be applied through passive braking. The torque application system 355 may determine this "maximum passive negative torque" based on the angular velocity of the wheels 305. For example, the angular velocity of the wheels 305 may limit how much power passive braking can generate from the wheels 305 to provide to the battery 315 or to dissipate as heat. In some embodiments, the torque application system 355 continually determines the angular velocity of the wheel 305 as it decreases from the negative torque applied by the torque application system 355. As the angular velocity of the wheel 305 decreases, the maximum passive negative torque generally also decreases. If the maximum passive negative torque becomes less than the target negative torque to be applied to the wheels 305, the torque application system 355 may apply the target negative torque through active braking.

In some embodiments, when passively braking, the torque application system 355 limits the power provided to the battery 315 by regenerative braking to some maximum value. For example, the battery 315 may be limited in how much current it can receive to be recharged, which thus may establish a maximum value of how much power can be provided to the battery 315 by regenerative braking. When applying a negative torque to a wheel 305 by a wheel hub motor 310 through passive braking, the torque application system 355 may route of the current generated by the wheel hub motor 310 through a resistor coupled to a frame of the electronic bicycle 300 such that the power provided to the battery 315 does not exceed the maximum value.

Figure 4:
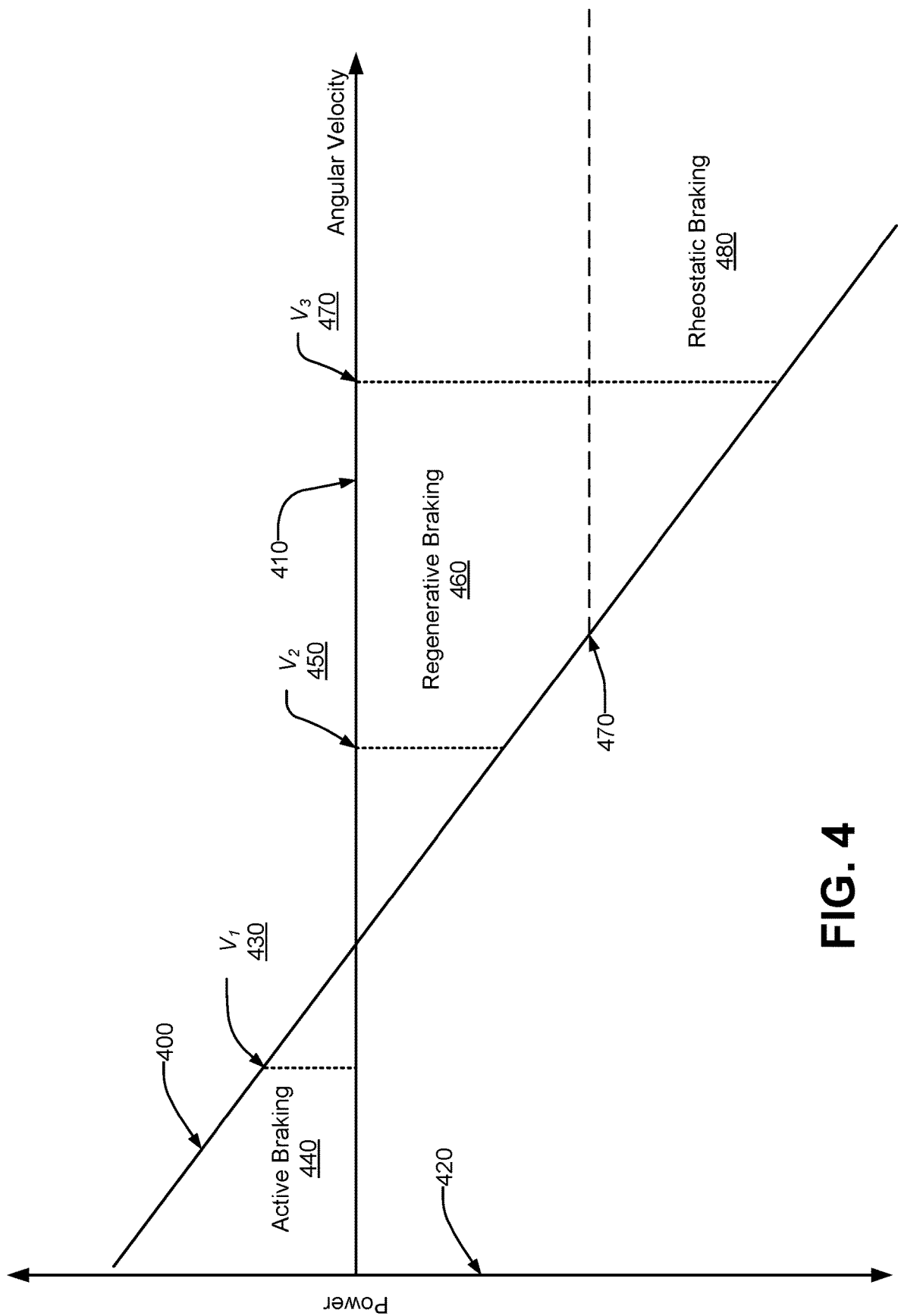
FIG. 4 illustrates how a target negative torque 400 may be applied to a wheel 305 by active braking, regenerative braking, and rheostatic braking at different angular velocities of the wheel 305, in accordance with some embodiments.

FIG. 4 illustrates how a target negative torque 400 may be applied to a wheel 305 by active braking, regenerative braking, and rheostatic braking at different angular velocities of the wheel 305, in accordance with some embodiments. The horizontal axis 410 represents the angular velocity of a wheel 305. The vertical axis 420 represents how much power a wheel hub motor 310 that is applying the target negative torque 400 is using to apply the target negative torque 400. When the power is positive, the wheel hub motor 310 is using power from the battery to apply the target negative torque 400, meaning the wheel hub motor 310 is actively braking. When the power is negative, the wheel hub motor 310 is generating power by applying the target negative torque 400, meaning the wheel hub motor 310 is passively braking.

At $V_1$ 430, the electronic bicycle 300 applies the target negative torque 400 through active braking 440, because $V_1$ 430 may be too low to achieve the target negative torque 400 through passive braking. At $V_2$ 450, the electronic bicycle 300 applies the target negative torque 400 through regenerative braking 460, because the $V_2$ 450 may be high enough that the target negative torque 400 can be achieved through regenerative braking 460. At $V_3$ 470, the electronic bicycle 300 applies the target negative torque 400 through a combination of regenerative braking 460 and rheostatic braking 480, because the power generated by the wheel hub motor 310 when applying the target negative torque 400 may exceed the maximum power 490 that the battery 315 can use to recharge.

The torque application system 355 may apply a negative torque to the wheels 305 through passive braking with a magnitude that can range from 0 to the magnitude of the maximum passive negative torque. If the magnitude of the target negative torque is less than or equal to that of the maximum passive negative torque, then the torque application system 355 may apply the target negative torque to the wheel 305 entirely through passive braking. If the magnitude of the target negative torque is greater than that of the maximum passive negative torque, the torque application system 355 may apply the target negative torque to the wheel 305 through active braking.

Exemplary Method for Balancing Passive and Active Braking

Figure 5:
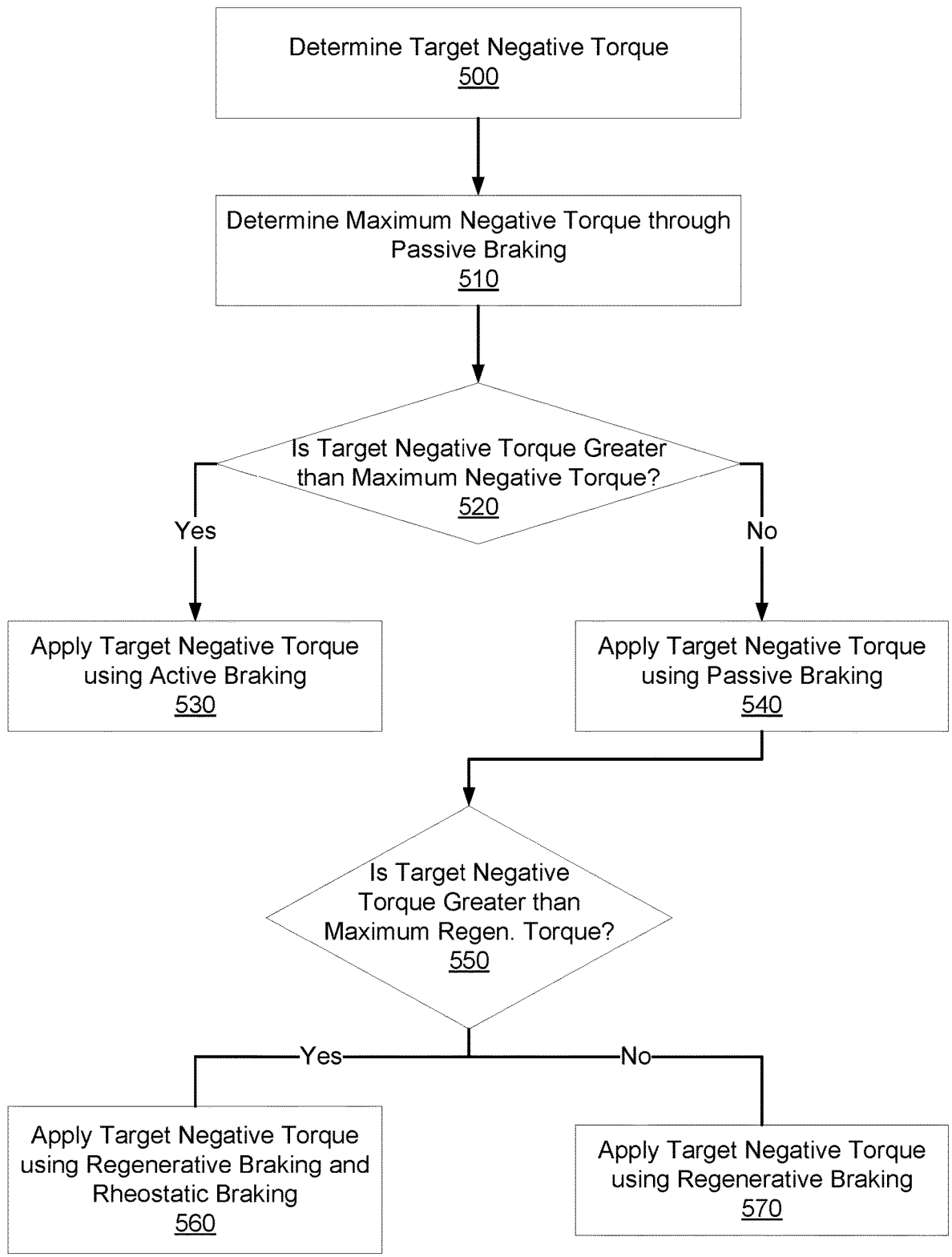
FIG. 5 is a flowchart illustrating an example method for balancing passive braking and active braking by a torque control system, in accordance with some embodiments.

FIG. 5 is a flowchart illustrating an example method for balancing passive braking and active braking by a torque control system, in accordance with some embodiments. Alternative embodiments may include more, fewer, or different steps from those illustrated in FIG. 4 and the steps may be performed in an order different from that illustrated.

The torque control system determines 500 a target negative torque to apply to a wheel of an electronic bicycle using a wheel hub motor. The torque control system may determine 500 a torque to apply to the front or rear wheel of the electronic bicycle, individually or together. The torque control system may determine 500 a target negative torque to apply based on user input signals received from other components of the electronic bicycle. For example, the torque control system may determine 500 a target negative torque based on user input signals received from a brake lever coupled to a handlebar of the electronic bicycle.

The torque control system determines 510 a maximum negative torque that the torque control system can apply to the wheels through passive braking. For example, the torque control system may determine a maximum negative torque that can be applied to a wheel through passive braking based on the current angular velocity of the wheel. The torque control system then compares 520 the target negative torque to the maximum negative torque to determine if the target negative torque is greater than the maximum negative torque. In some embodiments, the torque control system compares 520 the magnitude of the target negative torque with the magnitude of the maximum negative torque to determine if the magnitude of the target negative torque is greater than the magnitude of the maximum negative torque. If the target negative torque is greater than the maximum negative torque, then the torque control system applies 530 the target negative torque to the wheel using active braking. If the target negative torque is not greater than the maximum negative torque, then the torque control system applies 540 the target negative torque to the wheel using passive braking.

The torque control system may determine 550 whether the target negative torque is greater than a maximum regenerative torque. The maximum regenerative torque is a torque above which the wheel hub motor generates more power than a battery of the electronic bicycle can receive to recharge. The maximum regenerative torque may be based on the current angular velocity of the wheel to which the target negative torque will be applied. In some embodiments, the torque control system determines 550 whether the magnitude of the target negative torque is greater than the magnitude of the maximum regenerative torque. If the target negative torque is greater than the maximum regenerative torque, then the torque control system applies 560 the target negative torque to the wheel through a combination of regenerative braking and rheostatic braking. If the target negative torque is not greater than the maximum regenerative torque, then the torque control system applies 570 the target negative torque to the wheel through regenerative braking.

Exemplary Method for Slip Detection

Figure 6:
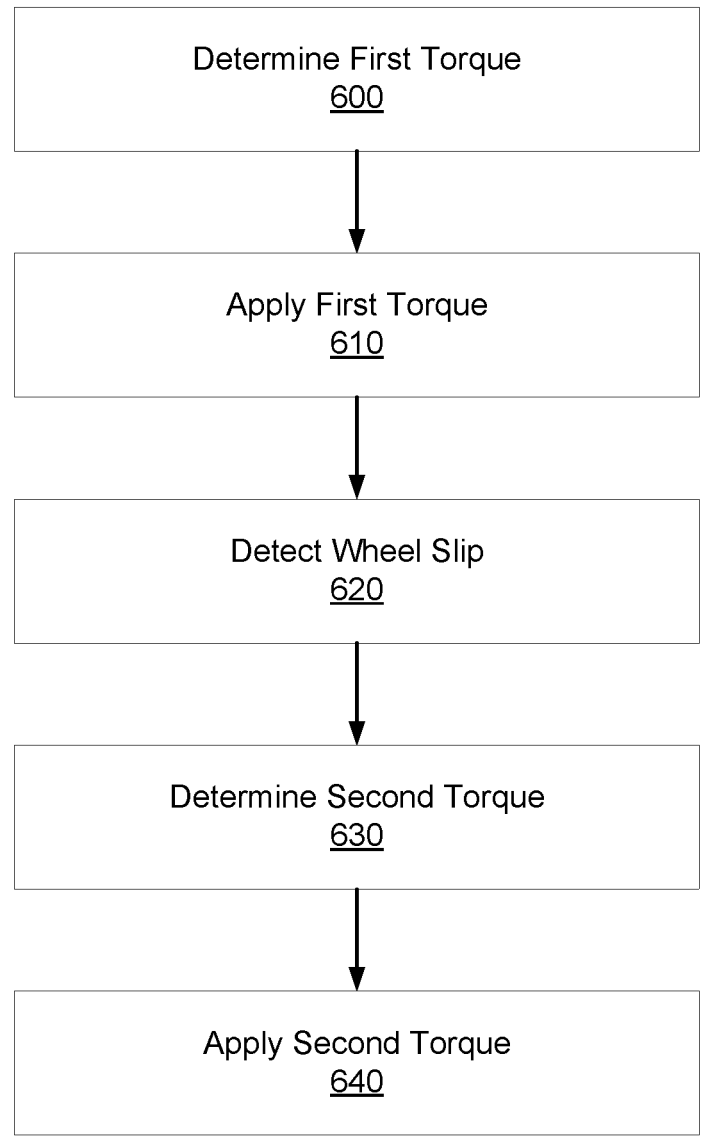
FIG. 6 is a flowchart illustrating an example method slip for detection by a torque control system, in accordance with some embodiments.

FIG. 6 is a flowchart illustrating an example method slip detection by a torque control system, in accordance with some embodiments. Alternative embodiments may include more, fewer, or different steps from those illustrated in FIG. 6 and the steps may be performed in an order different from that illustrated.

A torque control system determines 600 a first torque to apply to a wheel by a wheel hub motor. The torque control system may determine 600 a torque to apply to the front or rear wheel of the electronic bicycle, individually or together. Additionally, the determined first torque may be a positive torque or a negative torque. The torque control system may determine 600 the first torque to apply based on user input signals received from other components of the electronic bicycle. For example, the torque control system may determine 600 the first torque based on user input signals received from a brake lever coupled to a handlebar of the electronic bicycle or based on user input signals received from pedals of the electronic bicycle. The torque control system applies 610 the first torque to the wheel using the wheel hub motor.

The torque control system detects 620 that the wheel is slipping while the first torque is being applied to the wheel. The torque control system may detect 620 that the wheel is slipping based on the angular velocity of the wheel and the speed of the electronic bicycle. For example, if the wheel is spinning faster or slower than the wheel should be based on the speed of the electronic bicycle, then the torque control system may determine that the wheel is slipping.

The torque control system determines 630 a second torque to apply to the wheel. The second torque may be a torque with a magnitude that is smaller than the first torque. In some embodiments, the second torque has is a torque in the opposite direction from the first torque (e.g., if the first torque is a negative torque, then the second torque is a positive torque). The torque control system applies 640 the second torque to the wheel using the wheel hub motor.

In some embodiments, the torque control system detects that the wheel is no longer slipping while the second torque is applied. The torque control system may then apply a third torque to the wheel. The third torque may be equal to the first torque, or may have a magnitude that is between the first torque and the second torque.

Exemplary Method for Tip Detection

Figure 7:
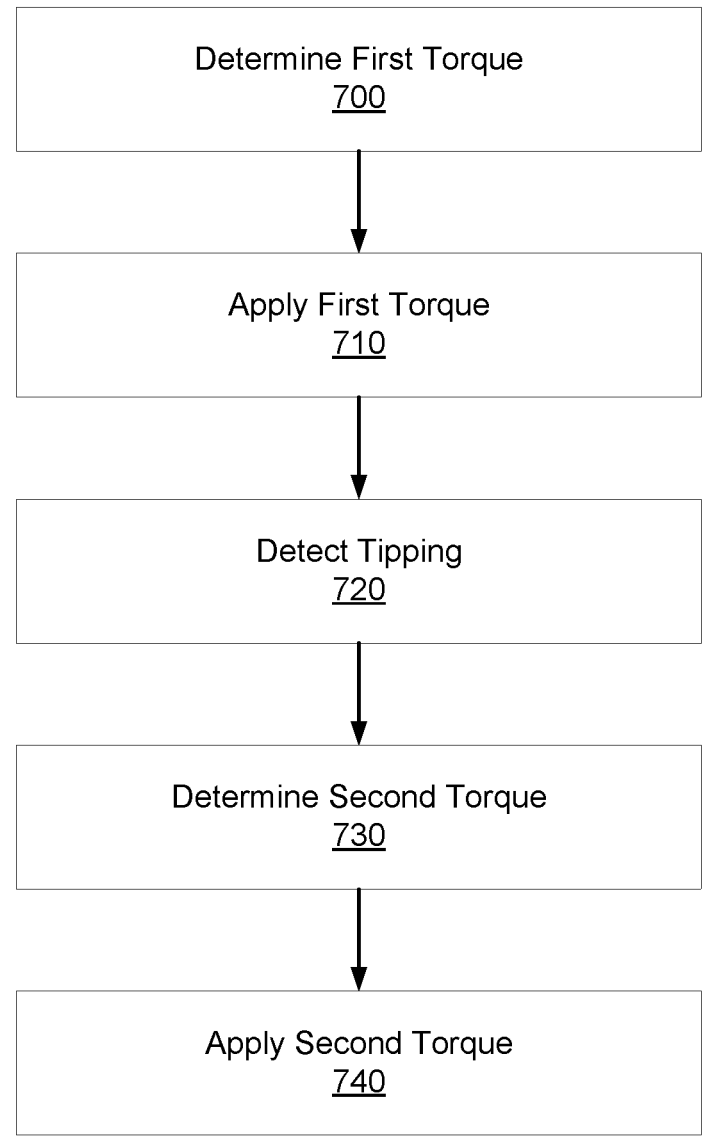
FIG. 7 is a flowchart illustrating an example method for tip detection by a torque control system, in accordance with some embodiments.

FIG. 7 is a flowchart illustrating an example method for tip detection by a torque control system, in accordance with some embodiments. Alternative embodiments may include more, fewer, or different steps from those illustrated in FIG. 7 and the steps may be performed in an order different from that illustrated.

A torque control system determines 700 a first torque to apply to a wheel by a wheel hub motor. The torque control system may determine a torque to apply to the front or rear wheel of the electronic bicycle, individually or together. Additionally, the determined first torque may be a positive or negative torque. The torque control system may determine 700 the first torque to apply based on user input signals received from other components of the electronic bicycle. For example, the torque control system may determine 700 the first torque based on user input signals received from a brake lever coupled to a handlebar of the electronic bicycle or based on user input signals received from pedals of the electronic bicycle. The torque control system applies 710 the first torque to the wheel using the wheel hub motor.

The torque control system detects 720 that the electronic bicycle is tipping while the first torque is being applied to the wheel. For example, the torque control system may detect 720 that the electronic bicycle is tipping such that the other wheel of the electronic bicycle is no longer in contact with the ground. The torque control system may detect 720 that the electronic bicycle is tipping based on an angular velocity of either wheel. The torque control system also may detect that the electronic bicycle is tipping based on a pitch rate of the electronic bicycle. For example, the torque control system may use a linear combination of the angular velocity of a wheel and the pitch rate to generate a tipping score that represents a likelihood that the electronic bicycle is tipping. If the tipping score exceeds some threshold, then the torque control system may detect 720 that the electronic bicycle is tipping. In some embodiments, the linear combination uses a difference between a measured angular velocity of a wheel and a predicted angular velocity of the wheel based on a speed of the electronic bicycle.

The torque control system determines 730 a second torque to apply to the wheel. The second torque may be a torque with a magnitude that is smaller than the first torque. In some embodiments, the second torque is a torque in the opposite direction from the first torque (e.g., if the first torque is a negative torque, then the second torque is a positive torque). The torque control system applies 740 the second torque to the wheel using the wheel hub motor.

In some embodiments, the torque control system detects that the electronic bicycle is no longer tipping while the second torque is applied. The torque control system may then apply a third torque to the wheel. The third torque may be equal to the first torque, or may have a magnitude that is between the first torque and the second torque.

Exemplary Method for Friction Determination

Figure 8:
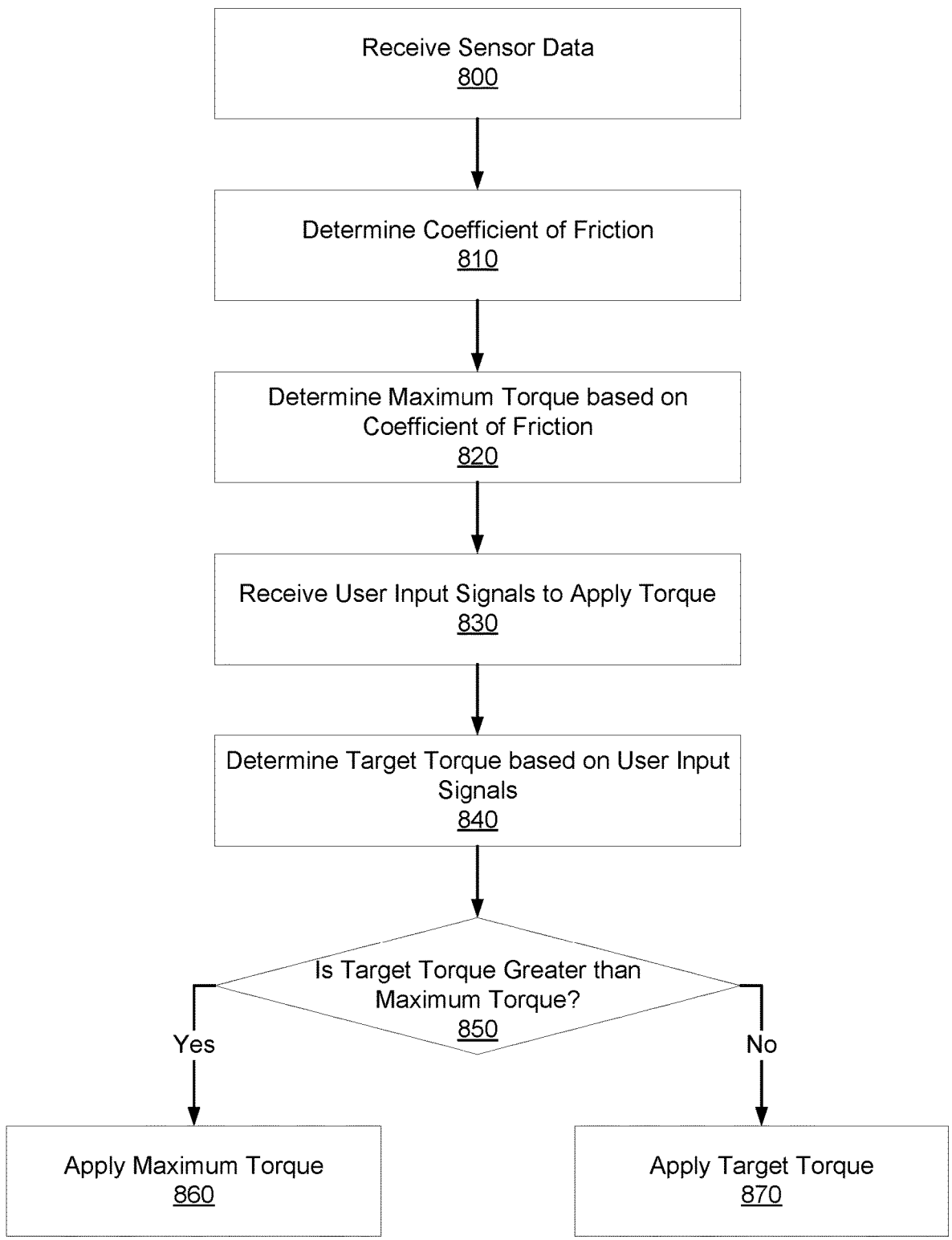
FIG. 8 is a flowchart illustrating an example method for friction determination by a torque control system, in accordance with some embodiments.

FIG. 8 is a flowchart illustrating an example method for friction determination by a torque control system, in accordance with some embodiments. Alternative embodiments may include more, fewer, or different steps from those illustrated in FIG. 8 and the steps may be performed in an order different from that illustrated.

The torque control system receives 800 sensor data from sensors on the electronic bicycle. For example, the torque control system may receive data from a rotary encoder that indicates the angular position of a wheel or may receive image data from a camera that captures images of an area around the electronic bicycle.

The torque control system determines 810 a coefficient of friction for a wheel of the electronic bicycle based on the sensor data. The torque control system may determine 810 a coefficient of static friction for the wheel or a coefficient of dynamic friction for the wheel. For example, the torque control system may cause a micro-slip of the wheel by temporarily increasing the torque applied to the wheel, and may determine based on the sensor data whether the wheel slipped when the torque was increased. The torque control system then determines 810 a coefficient of friction for the wheel based on the magnitude of the increased torque and whether the wheel slipped when the torque was increased.

The torque control system determines 820 a maximum torque that can be applied to the wheel by the wheel hub motor based on the determined coefficient of friction. The torque control system receives 830 user input signals to apply a torque to the wheel. For example, the torque control system may receive user input signals from a brake lever coupled to a handlebar of the electronic bicycle or based on user input signals received from pedals of the electronic bicycle. The user input signals may indicate a positive torque or a negative torque to apply to the wheels by the wheel hub motor. The torque control motor determines 840 a target torque to apply to a wheel based on the received user input signals.

The torque control system determines 850 whether the target torque is greater than the maximum torque that can be applied to the wheels based on the determined coefficient of friction. In some embodiments, the torque control system determines 850 whether the magnitude of the target torque is greater than the magnitude of the maximum torque that can be applied to the wheels based on the determined coefficient of friction. If the target torque exceeds the maximum torque, then the torque control system applies 860 the maximum torque to the wheel. If the target torque does not exceed the maximum torque, then the torque control system applies 870 the target torque to the wheel.

In some embodiments, the torque control system determines whether the target torque is greater than a threshold torque. The threshold torque is a torque that is lower than the maximum torque that can be applied based on the determined coefficient of friction. For example, the threshold torque may be 90% of the maximum torque. If the target torque is greater than the threshold torque, then the torque control system applies the threshold torque.

CONCLUSION

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Upon reading this disclosure, those of skill in the art will appreciate still additional alternative structural and functional designs for a system and a process for operating autonomous mobile robots in a facility through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

As used herein, the terms "comprises," "comprising," "includes," "including," "has," "having," or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive "or" and not to an exclusive "or". For example, a condition A or B is satisfied by any one of the following: A is true (or present) and B is false (or not present), A is false (or not present) and B is true (or present), and both A and B are true (or present). Additionally, the term "processor" or "processing units" is intended to cover one or more processors or one or more processing units. Similarly, the term "computer-readable medium" is intended to cover one or more computer-readable media.

What is claimed is:

1. An electronic bicycle, comprising:
   a wheel coupled to a wheel hub motor, wherein the wheel hub motor is configured to rotate the wheel;
   a battery coupled to the wheel hub motor, wherein the battery is configured to provide power to the wheel hub motor;
   a processor;
   a sensor coupled to the processor; and
   a non-transitory, computer-readable medium comprising instructions that, when executed by the processor, cause the processor to:
      receive sensor data from the sensor;
      determine a coefficient of friction for the wheel based on the sensor data;
      determine a maximum torque that can be applied to the wheel by the wheel hub motor based on the coefficient of friction;
      receive a user input signal indicating a user intent to decelerate the electronic bicycle;
      determine a target torque to apply to the wheel based on the user input signal;
      responsive to a magnitude of the target torque being greater than a magnitude of the maximum torque, apply the maximum torque to the wheel by the wheel hub motor.

2. The electronic bicycle of claim 1, wherein determining the coefficient of friction for the wheel comprises generating a micro-slip of the wheel using the wheel hub motor.

3. The electronic bicycle of claim 2, wherein determining the coefficient of friction further comprises:
   determining a first torque being applied to the wheel by the wheel hub motor;
   applying a second torque to the wheel by the wheel hub motor, wherein a magnitude of the second torque is greater than a magnitude of the first torque; and
   determining whether the wheel slipped while the second torque is applied to the wheel.

4. The electronic bicycle of claim 3, wherein determining the coefficient of friction further comprises: responsive to determining that the wheel slipped while the second torque is applied to the wheel, determining an upper bound on the coefficient of friction.

5. The electronic bicycle of claim 3, wherein determining the coefficient of friction further comprises: responsive to determining that the wheel did not slip while the second torque is applied to the wheel, determining a lower bound on the coefficient of friction.

6. The electronic bicycle of claim 3, wherein determining the coefficient of friction further comprises applying the first torque to the wheel by the wheel hub motor after a time period has passed after the second torque was applied to the wheel by the wheel hub motor.

7. The electronic bicycle of claim 1, wherein the sensor comprises a rotary encoder configured to capture data describing an angular position of the wheel.

8. The electronic bicycle of claim 1, wherein the sensor comprises a camera.

9. The electronic bicycle of claim 8, wherein determining a coefficient of friction comprises applying a machine-learning model to image data captured by the camera, wherein the machine-learning model is trained to determine a coefficient of friction for the wheel based on image data.

10. The electronic bicycle of claim 1, wherein the computer-readable medium further comprises instructions that, when executed by the processor, cause the processor to:
    determine a threshold torque based on the maximum torque, wherein a magnitude of the threshold torque is less than the magnitude of the maximum torque; and
    responsive to the magnitude of the target torque being greater than the magnitude of the threshold torque, applying the threshold torque to the wheel.

11. A non-transitory, computer-readable medium comprising instructions that, when executed by a processor, cause the processor to:
    receive sensor data from a sensor of an electronic bicycle;
    determine a coefficient of friction for a wheel of the electronic bicycle based on the sensor data;
    determine a maximum torque that can be applied to the wheel by a wheel hub motor based on the coefficient of friction, wherein the wheel hub motor is coupled to the wheel;
    receive a user input signal indicating a user intent to decelerate the electronic bicycle;
    determine a target torque to apply to the wheel based on the user input signal;
    responsive to a magnitude of the torque being greater than a magnitude of the maximum torque, apply the maximum torque to the wheel by the wheel hub motor.

12. The computer-readable medium of claim 11, wherein determining the coefficient of friction for the wheel comprises generating a micro-slip of the wheel using the wheel hub motor.

13. The computer-readable medium of claim 12, wherein determining the coefficient of friction further comprises:
    determining a first torque being applied to the wheel by the wheel hub motor;
    applying a second torque to the wheel by the wheel hub motor, wherein a magnitude of the second torque is greater than a magnitude of the first torque; and
    determining whether the wheel slipped while the second torque is applied to the wheel.

14. The computer-readable medium of claim 13, wherein determining the coefficient of friction further comprises: responsive to determining that the wheel slipped while the second torque is applied to the wheel, determining an upper bound on the coefficient of friction.

15. The computer-readable medium of claim 13, wherein determining the coefficient of friction further comprises: responsive to determining that the wheel did not slip while the second torque is applied to the wheel, determining a lower bound on the coefficient of friction.

16. The computer-readable medium of claim 13, wherein determining the coefficient of friction further comprises applying the first torque to the wheel by the wheel hub motor after a time period has passed after the second torque was applied to the wheel by the wheel hub motor.

17. The computer-readable medium of claim 12, wherein the sensor comprises a rotary encoder configured to capture data describing an angular position of the wheel.

18. The computer-readable medium of claim 12, wherein the sensor comprises a camera.

19. The computer-readable medium of claim 18, wherein determining a coefficient of friction comprises applying a machine-learning model to image data captured by the camera, wherein the machine-learning model is trained to determine a coefficient of friction for the wheel based on image data.

20. The computer-readable medium of claim 12, further storing instructions that, when executed by the processor, cause the processor to:
- determine a threshold torque based on the maximum torque, wherein a magnitude of the threshold torque is less than the magnitude of the maximum torque; and
- responsive to the magnitude of the target torque being greater than the magnitude of the threshold torque, applying the threshold torque to the wheel.

* * * * *